United States Patent Office 2,915,407
Patented Dec. 1, 1959

2,915,407

CERAMIC ELECTRICAL BODIES

Leslie K. Gulton, Metuchen, N.J., assignor to Gulton Industries, Inc., Metuchen, N.J., a corporation of New Jersey No Drawing. Application March 11, 1957
Serial No. 644,964

14 Claims. (Cl. 106—39)

This invention relates to the production of improved ceramic solid solutions mainly of lead titanate and lead zirconate so modified, as described hereafter, to improve most markedly their insulation resistance at elevated temperatures as well as others of their electrical properties.

In Patent No. 2,708,244, dated May 10, 1955, piezoelectric transducers are disclosed in which there is utilized a ceramic element consisting of a solid solution of lead titanate and lead zirconate in which the lead titanate lies within the range of 10 to 95 mol percent, more narrowly within the range of 10 to 60 mol percent and particularly the range of 42 to 47 mol percent, the remainder being lead zirconate. The said ceramic elements are shown to be prepared by mixing together lead oxide (PbO), zirconium oxide ($ZrO_2$), and titanium dioxide ($TiO_2$), pressing said mixture into discs or other desired shapes, heat-treating by raising the temperature gradually and then maintaining the temperature at about 1220 degrees C. (2228 degrees F.) for about 30 minutes followed by cooling. The said ceramic bodies are then provided with a pair of silver electrodes and electrically polarized at room temperature by application of a direct current field strength of 150 to 175 volts per mil for about 1 hour.

The resulting piezoelectric transducers of the aforesaid Patent No. 2,708,244 have a number of advantages over barium titanate and other transducers, as outlined in said patent. One of their important disadvantages, however, resides in their low voltage output. Thus, for instance, in the preferred embodiment of said patent, the output of said transducer was found to be 0.2 volt. This is to be contrasted with an output of 0.7 volt in the case of a conventional barium titanate transducer.

In application Serial No. 615,017, filed October 10, 1956, it is disclosed that very significant increases in voltage output can be obtained in transducers of the type comprising solutions of lead titanate and lead zirconate. This is accomplished through the conjoint effect of (1) utilizing red lead or $Pb_3O_4$ in place of PbO, and (2) heat treating or firing the ceramic mixture ($Pb_3O_4$, $ZrO_2$ and $TiO_2$) while maintaining the same under a pressure of at least 75 pounds per square inch and, more particularly, at a pressure in excess of 500 pounds per square inch. Depending upon the exact proportions of $Pb_3O_4$, $ZrO_2$ and $TiO_2$, the exact firing temperature, time and pressure, and upon the manner in which electrical polarization is effected, voltage outputs of 2 to 3 volts can be obtained from transducers made in accordance with the aforesaid invention.

In addition to the unusual electrical characteristics of the ceramic bodies produced in accordance with the invention of the aforementioned application, their physical characteristics are also highly desirable from the standpoint of homogeneity, low internal stress, and high density, with a minimum of voids therein, depending upon the exact pressure utilized during the firing operation, as, for instance, less than 2% or even less than 1% of voids.

The aforesaid application points out the importance of utilizing lead oxide specifically in the form of $Pb_3O_4$ or red lead, or, in place of a preformed $Pb_3O_4$, the employment of mixtures of PbO and $PbO_2$ in the requisite proportions to produce $Pb_3O_4$ as, for instance, 2 mols of PbO and 1 mol of $PbO_2$, whereby, in effect, $Pb_3O_4$ is produced in situ, although this latter approach does not represent the particularly preferred embodiment of said invention, said particularly preferred embodiment involving the use, as indicated, of preformed $Pb_3O_4$ or red lead. Mixtures of $Pb_3O_4$ and other lead oxides, particularly $PbO_2$, and especially in which the $Pb_3O_4$ constitutes of the order of at least 50% and, better still, at least 75% by weight of the lead oxide constituent of the ceramic mixture are also stated to be employable with good results. The essential ingredients of the ceramic mixes disclosed in the aforementioned application, therefore, include $Pb_3O_4$ (or mixtures of lead oxides which, in situ, produce $Pb_3O_4$ or mixtures of $Pb_3O_4$ with other lead oxides as described), $ZrO_2$ and $TiO_2$ in requisite proportions to produce solid solutions of lead titanate and lead zirconate, particularly in molal proportions such as to produce a lead titanate content in the range of 10 to 95 mol percent. Small proportions, generally from a fraction of 1% to about 5%, of various other oxides as, for example, tin oxides, rare earth metal oxides such as cerium oxide, samarium oxide, lanthanum oxide, yttrium trioxide, germanium oxide, rubidium oxide, thallium oxide, and mixtures thereof, and other addition agents such as lead fluoride, as described in the aforementioned application, can be included in the ceramic mix prior to the pressure and firing treatment.

The present invention is predicated on the discovery that the inclusion in the aforesaid mixes of cerium oxides and/or columbium (niobium) oxides, or materials which during the firing operation are converted to cerium oxides or columbium oxides, results in the production of ceramic lead titanate-lead zirconate bodies with startlingly increased insulation resistance, and, in certain instances, increased capacitance, at high temperatures. Furthermore, the ceramic bodies of my present invention,, generally speaking, have the advantage of showing greater uniformity or less variation in their capacitance and output with changes in temperature. As indicative of the nature of the increases in megohm insulation resistance at elevated temperatures brought about by the present invention, reference may be made to a typical lead titanate-lead zirconate ceramic composition made pursuant to the aforesaid U.S. Patent No. 2,708,244 which showed an insulation resistance of less than 1 megohm at 450 degrees F. as measured at a given thickness. Again, with ceramic compositions exemplified by Example 1 of the aforementioned application, insulation resistances of the order of 2 to 20 megohms at 450 degrees F. are obtained depending upon the thickness of the ceramic body. Through the practice of the present invention, insulation resistances of the order of several thousand megohms at 450 degrees F. and obtainable. This is of great value and importance in connection with the production of transducers, capacitors and related devices, particularly in use at elevated temperatures. Various of the ceramic compositions of the present invention also lend themselves to use as varistors, the insulation resistance being extremely voltage dependent, particularly where said varistors are required to stand up under high temperature usage.

The proportions of cerium oxides and/or columbium oxides utilized are distinctly minor in amount, generally ranging from about 0.5% to about 7%, by weight of the ceramic mix, with an average in the range of about 1 to 3% which will be satisfactory in most cases. While various cerium oxides and columbium oxides or mixtures thereof can be used, such as $CeO_2$, $Ce_2O_3$, $CeO_3$, (or hydroxides such as $2CeO_2 \cdot 3H_2O$ and $2Ce(OH)_3 \cdot 3H_2O$), CbO, CbO$_2$, Cb$_2$O$_3$ and Cb$_2$O$_5$, I find it advantageous to use CeO$_2$ and Cb$_2$O$_5$.

While the invention is especially applicable to the production of mixtures comprising mainly lead titanate and lead zirconate when prepared as described above, namely, by firing, under elevated pressures, mixtures of red lead, zirconium oxide and titanium dioxide, and small proportions of cerium oxides and/or columbium oxides, it can with reasonably good results be applied in those cases where the lead oxide employed is PbO as, for instance, in the aforementioned U.S. Patent No. 2,708,244, or mixtures of PbO and red lead, as well as other lead oxides, or lead compounds which yield lead oxide or lead oxides under the elevated temperatures utilized in the firing step or the heating up to firing temperatures, hereafter generically called lead oxide or lead oxides.

I have also discovered that certain significant advantages are obtained by the inclusion of small amounts of lanthanum oxides, for instance, La$_2$O$_3$ (or materials which during the firing are converted to lanthanum oxides), in the aforementioned mixes containing lead oxides, titanium oxides, zirconium oxides and cerium oxides and/or columbium oxides. These advantages reside mainly in producing sharp increases in capacitance at room temperature. The addition of too great an amount of lanthanum oxide lowers the capacity somewhat and lowers the output voltage substantially. Good results are obtained in at least most cases by the use of lanthanum oxides in amounts of the order of 0.1% to about 4% by weight of the ceramic mix. Somewhat lower percentages can be used with lesser effects and materially higher percentages, generally of the order of 8 to 10%, bring about too great a reduction in voltage output to be of any practicality.

I am aware that it has heretofore been suggested to incorporate cerium oxide into certain specific ceramic dielectric compositions, namely, mixtures of barium titanate and strontium titanate (see U.S. Patent No. 2,776,898, patented January 8, 1957), but such has no bearing on my present invention either in concept or the functions and results achieved by my present invention.

The firing of the ceramic bodies, produced in accordance with the present invention, is carried out while maintaining said bodies under a pressure of at least 75 pounds per square inch. In the particularly preferred embodiments of the invention, however, materially higher pressures are utilized, for instance, pressures of the order of at least 300 to 500 or 750 to 850 pounds per square inch and upwards even to as high as pressures of the order of 5,000 pounds per square inch or more. The preformed ceramic bodies may be maintained under pressure in any desired manner, as, for instance, through suitable clamping plates or the like or the ceramic materials can be molded or shaped or formed as desired and, while maintained under pressure of the desired magnitude, placed into a furnace or the like to carry out the firing operation. The ceramic bodies can be produced in any desired shapes as, for instance, sheets, tubes, rods, discs, and the like, and the term "bodies" is, therefore, used herein in a generic sense to cover the ceramic products in whatever physical shape or form they may be prepared.

It will be understood that the present invention does not depend on any particular method or equipment used for applying the pressure to the ceramic materials during the firing operation. Moreover, in the application of the pressure, the same may be applied initially at room temperatures or before the furnace is brought to the desired firing temperature, or such pressure can first be applied somewhat below or at the ultimate selected firing temperature. At any rate, once the firing temperature is reached, if sufficient pressure is not already being exerted on the ceramic materials, the pressure is increased until the desired value or values are reached and firing is completed.

The firing operation is most conveniently carried out in an ordinary air atmosphere. The utilization of oxidizing atmospheres other than air as well as neutral gas atmospheres, in the firing operation, is within the scope of the invention and, by such procedures, certain variations can be obtained in the character of the final fired ceramic bodies when used in the manufacture of transducers.

The firing temperatures and times may be varied depending, among other things, upon the particular ceramic composition utilized and the exact results desired. Generally speaking, at least in most cases, firing temperatures of the order of about 1800 to about 2300 degrees F., usually 2000 to 2200 degrees F., and time periods of the order of a few minutes to a few hours, ordinarily within the range of about 20 to 45 minutes, will be found to be quite satisfactory. In general, the higher the pressure the shorter will be the period of time and lower the firing temperature to obtain a given desired result.

While, in the preferred embodiments of the invention, the ceramic materials, as described above, are admixed to form a uniform, homogeneous admixture and then subjected to forming or shaping techniques for the production of the ceramic bodies in the particular shape or form desired, it will also be understood that said ceramic mixtures may be produced in the form of pastes as, for instance, by dispersing the powdered ceramic mixture in water or an organic solvent or a vehicle or a binder. During the firing operation, the water or solvent or vehicle or binder, as the case may be, will evaporate or burn out of the ceramic material.

It should also be noted that, where the ceramic material is produced in the form of a rod, disc or shaped solid body, after being fired under pressure, as described above, said shaped solid body can be ground or otherwise disintegrated to form pulverulent particles of powders and the latter can be used to form bodies, through compression techniques with or without various binders, having interesting electrical and related properties.

The following examples are illustrative of the practice of the present invention. It will be understood that other compositions can readily be prepared, in the light of the guiding principles and teachings contained herein, and the examples are, therefore, not to be construed in any way as limitative of the full scope of the invention. Other supplemental materials, whether oxides or other agents, in minor proportions, which do not adversely affect the desired electrical properties of the ceramic bodies of the present invention may be incorporated into the ceramic mix before the pressure and firing treatment without departing from the principles and the teachings of the present invention.

EXAMPLE 1

(a) 1371.3 grams Pb$_3$O$_4$, 215.7 grams TiO$_2$, 406.6 grams ZrO$_2$, and 40.1 grams CeO$_2$ are admixed to provide a homogeneous composition, the latter is shaped into elements having a thickness of 12 mils and a diameter of 290 mils, compressed under a pressure of 800 pounds per square inch and, while maintaining said pressure, are gradually heated to 2100 degrees F. and held at said temperature for a period of 30 minutes after which the temperature is allowed to decrease to room temperature and the pressure is then removed.

(b) Silver electrodes may be applied to the elements in conventional manner and said elements may then be polarized by applying a direct current potential, for instance, of 170 volts per mil for a total of 14 kilovolts for a period of 60 minutes. Thereafter, the polarized elements may be stabilized by a heat-cycling procedure wherein said elements are gradually heated up to about 500 degrees F. followed by gradual cooling to room temperature.

(c) The non-polarized elements, at 30 volts, showed an insulation resistance, in KMΩ after 450 to 500 degrees F., of 100.

The following additional examples are prepared following the techniques described in Example 1. All parts listed are by weight in grams.

EXAMPLE 2
| | |
|---|---|
| Red lead | 1370 |
| Titanium dioxide | 215 |
| Zirconium oxide | 405 |
| Cerium oxide ($CeO_2$) | 20 |

EXAMPLE 3
| | |
|---|---|
| Red lead | 1312.7 |
| Titanium dioxide | 204.9 |
| Zirconium oxide | 386.3 |
| Columbium pentoxide ($Cb_2O_5$) | 100.0 |

EXAMPLE 4
| | |
|---|---|
| Red lead | 1310 |
| Titanium dioxide | 200 |
| Zirconium oxide | 385 |
| Columbium pentoxide ($Cb_2O_5$) | 50 |

EXAMPLE 5
| | |
|---|---|
| Red lead | 1290 |
| Titanium dioxide | 196 |
| Zirconium oxide | 375 |
| Columbium pentoxide ($Cb_2O_5$) | 13 |

EXAMPLE 6
| | |
|---|---|
| Red lead | 1315 |
| Titanium dioxide | 207 |
| Zirconium oxide | 393 |
| Columbium pentoxide ($Cb_2O_5$) | 12.5 |
| Cerium oxide ($CeO_2$) | 10 |

EXAMPLE 7
| | |
|---|---|
| Red lead | 1370 |
| Titanium dioxide | 215 |
| Zirconium oxide | 405 |
| Columbium pentoxide ($Cb_2O_5$) | 12.5 |
| Cerium oxide ($CeO_2$) | 10.0 |
| Lanthanum oxide ($La_2O_3$) | 10.0 |

EXAMPLE 8
| | |
|---|---|
| Lead oxide (PbO) | 240 |
| Titanium dioxide | 110 |
| Zirconium oxide | 200 |
| Cerium oxide | 5 |

EXAMPLE 9
| | |
|---|---|
| Lead oxide (PbO) | 240 |
| Titanium dioxide | 112 |
| Zirconium oxide | 205 |
| Columbium pentoxide | 5 |

EXAMPLE 10
| | |
|---|---|
| Lead oxide (PbO) | 125 |
| Red lead | 120 |
| Titanium dioxide | 110 |
| Zirconium oxide | 200 |
| Cerium oxide | 5 |

EXAMPLE 11
| | |
|---|---|
| Lead oxide (PbO) | 100 |
| Red lead | 140 |
| Titanium dioxide | 110 |
| Zirconium oxide | 200 |
| Cerium oxide | 3 |
| Columbium pentoxide | 2 |

EXAMPLE 12
| | |
|---|---|
| Red lead | 1371.3 |
| Titanium dioxide | 215.7 |
| Zirconium oxide | 406.6 |
| Cerium oxide ($CeO_2$) | 5.0 |
| Columbium oxide ($Cb_2O_5$) | 25.0 |
| Lanthanum oxide ($La_2O_3$) | 3.3 |

EXAMPLE 13
| | |
|---|---|
| Red lead | 1443.3 |
| Titanium dioxide | 215.7 |
| Zirconium oxide | 406.6 |
| Cerium oxide ($CeO_2$) | 5.0 |
| Columbium oxide ($Cb_2O_5$) | 3.8 |
| Lanthanum oxide ($La_2O_3$) | 72.0 |

EXAMPLE 14
| | |
|---|---|
| Lead oxide (PbO) | 240 |
| Titanium dioxide | 110 |
| Zirconium oxide | 200 |
| Columbium oxide ($Cb_2O_5$) | 5 |
| Tantalum oxide ($La_2O_3$) | 4 |

EXAMPLE 15
| | |
|---|---|
| Lead oxide (PbO) | 240 |
| Titanium dioxide | 110 |
| Zirconium oxide | 200 |
| Cerium oxide ($CeO_2$) | 3 |
| Columbium oxide ($Cb_2O_5$) | 3 |
| Tantalum oxide ($La_2O_3$) | 2 |

The following tables show the insulation resistances and others of the properties of the ceramic bodies of Examples 2 to 9, inclusive, 12 and 13.

*Table I*

[Insulation resistance measured at 30 volts.]

| Example | KMΩ After 450 to 500 degrees F. | Meg Ω. at 450 degrees F. | Capacity, Mmf. (Room Temp.) | Density | Output, volts |
|---|---|---|---|---|---|
| 2—disc, 0.012" thick, 250 mils diameter | 30 | 1,200 | 600 | 7.2 | -------- |
| 3—disc, 0.025" thick, 250 mils diameter | 300 | 8,100 | 390 | 7.1 | -------- |
| 4—disc, 0.025" thick, 250 mils diameter | 200 | 9,000 | 500 | 7.7 | -------- |
| 5—disc, 0.012" thick, 290 mils diameter | 40 | 1,800 | 1,900 | 7.9 | -------- |
| 6—disc, 0.012" thick, 290 mils diameter | 60 | 1,800 | 1,600 | 8.0 | -------- |
| 7—disc, 0.012" thick, 290 mils diameter | 30 | 3,000 | 1,400 | 7.7 | -------- |
| 12—disc, 0.012" thick, 250 mils diameter | -------- | 3,000 | 1,400 | -------- | 1.5 |
| 13—disc, 0.012" thick, 250 mils diameter | -------- | 300 | 2,500 | -------- | 2.5 |

*Table II*

[Insulation resistance in KMΩ measured at 100 volts.]

| Example | Room Temp., 87 degrees F. | 100 degrees F. | 200 degrees F. | 300 degrees F. | 400 degrees F. | 500 degrees F. |
|---|---|---|---|---|---|---|
| 5 | 350 | 300 | 200 | 100 | 15 | 4.5 |
| 6 | 350 | 220 | 40 | 80 | 15 | 5 |
| 7 | 140 | 140 | 200 | 110 | 15 | 13 |

The marked reduction in drop-off of insulation resistance at temperatures in the range of 300 to 500 degrees F. may be noted from the fact that, at a temperature of 300 degrees F., corresponding ceramic compositions but omitting the columbium oxide and the cerium oxide, the samples corresponding to those of Examples 5, 6 and 7 in thickness and diameter and measured at 100 volts, show a drop-off to within the range of 0.15 to 0.28 KMΩ; at a temperature of 400 degrees F. a drop-off to within the range of 0.008 to 0.018 KMΩ; and at a temperature of 500 degrees F. a drop-off to within the range of 0.002 to 0.006 KMΩ.

In the case of Example 12, it may be noted that a disc made in exactly the same way but without the addition of the cerium oxide and the lanthanum oxide, showed an insulation resistance at 450 degrees F. of 2 megohms, a capacity at room temperature of 600 mmfd., and an output voltage of 3 volts.

While the invention has been described in detail, no unnecessary limitations should be read thereinto, the scope of the invention being pointed out in the appended claims.

This application is a continuation-in-part of my prior application Serial No. 615,017, filed October 10, 1956.

What is claimed as new and desired to be protected by Letters Patent of the United States is:

1. In a method of producing ceramic bodies having increased insulation resistance at high temperatures consisting essentially of solid solutions of lead titanate and lead zirconate in which the lead titanate is present in proportions within the range of 10 to 95 mol percent, which method includes preparing a mixture consisting essentially of $Pb_3O_4$, $ZrO_2$ and $TiO_2$, in requisite proportions to produce the aforesaid solid solutions of lead titanate and lead zirconate, forming said mixture into a body of desired shape, and firing said mixture at an elevated firing temperature while maintaining said mixture at a pressure of at least 75 pounds per square inch, the improvement which comprises incorporating into said mixture, prior to the firing step, from 0.5% to 7%, by weight of said mixture, of at least one material selected from the group consisting of cerium oxides and columbium oxides.

2. In a method of producing ceramic bodies having increased insulation resistance at high temperatures consisting essentially of solid solutions of lead titanate and lead zirconate in which the lead titanate is present in proportions within the range of 35 to 55 mol percent, which method includes preparing of mixture consisting essentially of $Pb_3O_4$, $ZrO_2$ and $TiO_2$, in requisite proportions to produce the aforesaid solid solutions of lead titanate and lead zirconate, forming said mixture into a body of desired shape, and firing said mixture at an elevated firing temperature while maintaining said mixture at a pressure of at least 500 pounds per square inch, the improvement which comprises incorporating into said mixture, prior to the firing step, from 0.5% to 7% by weight of said mixture, of at least one material selected from the group consisting of cerium oxides and columbium oxides.

3. In a method of producing ceramic bodies having increased insulation resistance at high temperatures consisting essentially of solid solutions of lead titanate and lead zirconate in which the lead titanate is present in proportions within the range of 35 to 55 mol percent, which method includes preparing a mixture consisting essentially of $Pb_3O_4$ and $PbO_2$ in which the $Pb_3O_4$ constitutes not less than 50% of said lead oxides, $ZrO_2$ and $TiO_2$, in requisite proportions to produce the aforesaid solid solutions of lead titanate and lead zirconate, forming said mixture into a body of desired shape, and firing said mixture at an elevated firing temperature while maintaining said mixture at a pressure of at least 500 pounds per square inch, the improvement which comprises incorporating into said mixture, prior to the firing step, from 0.5% to 7%, by weight of said mixture, of at least one material selected from the group consisting of cerium oxides and columbium oxides.

4. In a method of producing ceramic bodies having increased insulation resistance at high temperatures consisting essentially of solid solutions of lead titanate and lead zirconate in which the lead titanate is present in proportions within the range of 10 to 95 mol percent, which method includes preparing a mixture consisting essentially of a lead oxide, $ZrO_2$ and $TiO_2$, in requisite proportions to produce the aforesaid solid solutions of lead titanate and lead zirconate, forming said mixture into a body of desired shape, and firing said mixture at an elevated firing temperature while maintaining said mixture at a pressure of at least 75 pounds per square inch, the improvement which comprises incorporating into said mixture, prior to the firing step, from 0.5% to 7%, by weight of said mixture, of at least one material selected from the group consisting of cerium oxides and columbium oxides.

5. In a method of producing ceramic bodies having increased insulation resistance at high temperatures consisting essentially of solid solutions of lead titanate and lead zirconate in which the lead titanate is present in proportions within the range of 10 to 95 mol percent, which method includes preparing a mixture consisting essentially of a lead oxide, $ZrO_2$ and $TiO_2$, in requisite proportions to produce the aforesaid solid solutions of lead titanate and lead zirconate, forming said mixture into a body of desired shape, and firing said mixture at an elevated firing temperature while maintaining said mixture at a pressure of at least 75 pounds per square inch, the improvement which comprises incorporating into said mixture, prior to the firing step, from 0.5% to 7% of at least one material selected from the group consisting of cerium oxides and columbium oxides, and up to about 4% of lanthanum oxide, said percentages being based on the weight of the mixture.

6. In a method of producing ceramic bodies having increased insulation resistance at high temperatures consisting essentially of solid solutions of lead titanate and lead zirconate in which the lead titanate is present in proportions within the range of 35 to 55 mol percent, which method includes preparing a mixture consisting essentially of $Pb_3O_4$, $ZrO_2$ and $TiO_2$, in requisite proportions to produce the aforesaid solid solutions of lead titanate and lead zirconate, forming said mixture into a body of desired shape, and firing said mixture at an elevated firing temperature while maintaining said mixture at a pressure of at least 500 pounds per square inch, the improvement which comprises incorporating into said mixture, prior to the firing step, from 0.5% to 7%, by weight of said mixture, of at least one material selected from the group consisting of cerium oxides and columbium oxides, and from 0.1% to 4%, by weight of said mixture, of lanthanum oxide.

7. A new and improved ceramic body having increased insulation resistance at high temperatures consisting essentially of a solid solution of lead titanate and lead zirconate in which the lead titanate is present in proportions within the range of 10 to 95 mol percent, consisting essentially of a compressed substantially homogeneous fired body of a mixture of $Pb_3O_4$, $ZrO_2$ and $TiO_2$, in requisite proportions to produce the aforesaid solid solutions of lead titanate and lead zirconate, said mixture also including from 0.5% to 7%, by weight of said mixture, of at least one material selected from the group consisting of cerium oxides and columbium oxides, said final mixture having been subjected to a pressure of at least 75 pounds per square inch during the firing operation.

8. A new and improved ceramic body having increased insulation resistance at high temperatures consisting essentially of a solid solution of lead titanate and lead zirconate in which the lead titanate is present in proportions within the range of 35 to 55 mol percent, consisting essentially of a compressed substantially homogeneous fired body of a mixture of $Pb_3O_4$, $ZrO_2$ and $TiO_2$, in requisite proportions to produce the aforesaid solid solutions of lead titanate and lead zirconate, said mixture also including from 0.5% to 7%, by weight of said mixture, of at least one material selected from the group consisting of cerium oxides and columbium oxides, said final mixture having been subjected to a pressure of at least 500 pounds per square inch during the firing operation.

9. A new and improved ceramic body having increased insulation resistance at high temperatures consisting essentially of a solid solution of lead titanate and lead zirconate in which the lead titanate is present in proportions within the range of 35 to 55 mol percent, consisting essentially of a compressed substantially homogeneous fired body of a mixture of $Pb_3O_4$ and $PbO_2$ in which the $Pb_3O_4$ constitutes not less than 50% of said lead oxides, $ZrO_2$ and $TiO_2$, in requisite proportions to produce the aforesaid solid solutions of lead titanate and lead zirconate, said mixture also including from 0.5% to 7%, by weight of said mixture, of at least one material selected from the group consisting of cerium oxides and columbium oxides, said final mixture having been subjected to a pressure of at least 300 pounds per square inch during the firing operation.

10. A new and improved ceramic body having increased insulation resistance at high temperatures consisting essentially of a solid solution of lead titanate and lead zirconate in which the lead titanate is present in proportions within the range of 10 to 95 mol percent, consisting essentially of a compressed substantially homogeneous fired body of a mixture of $ZrO_2$, $TiO_2$, and lead oxide at least mainly in the form of $Pb_3O_4$, in requisite proportions to produce the aforesaid solid solutions of lead titanate and lead zirconate, said mixture also including from 0.5% to 7%, by weight of said mixture, of at least one material selected from the group consisting of cerium oxides and columbium oxides, said final mixture having been subjected to a pressure of at least 75 pounds per square inch during the firing operation, said ceramic body having less than 2% of voids therein.

11. A new and improved ceramic body having increased insulation resistance at high temperatures consisting essentially of a solid solution of lead titanate and lead zirconate in which the lead titanate is present in proportions within the range of 10 to 95 mol percent, consisting essentially of a compressed substantially homogeneous fired body of a mixture of a lead oxide, $ZrO_2$ and $TiO_2$, in requisite proportions to produce the aforesaid solid solutions of lead titanate and lead zirconate, said mixture also including from 0.5% to 7%, by weight of said mixture, of at least one material selected from the group consisting of cerium oxides and columbium oxides, said final mixture having been subjected to a pressure of at least 75 pounds per square inch during the firing operation.

12. A new and improved ceramic body having increased insulation resistance at high temperatures consisting essentially of a solid solution of lead titanate and lead zirconate in which the lead titanate is present in proportions within the range of 10 to 95 mol percent, consisting essentially of a compressed substantially homogeneous fired body of a lead oxide, $ZrO_2$ and $TiO_2$, in requisite proportions to produce the aforesaid solid solutions of lead titanate and lead zirconate, said mixture also including from 0.5% to 7%, by weight of said mixture, of at least one material selected from the group consisting of cerium oxides and columbium oxides, and up to about 4%, by weight of said mixture, of lanthanum oxide, said final mixture having been subjected to a pressure of about 300 to 850 pounds per square inch during the firing operation.

13. A new and improved ceramic body having increased insulation resistance at high temperatures consisting essentially of a solid solution of lead titanate and lead zirconate in which the lead titanate is present in proportions within the range of 35 to 55 mol percent, consisting essentially of a compressed substantially homogeneous fired body of a lead oxide, $ZrO_2$ and $TiO_2$, in requisite proportions to produce the aforesaid solid solutions of lead titanate and lead zirconate, said mixture also including from 0.5% to 7%, by weight of said mixture, of at least one material selected from the group consisting of cerium oxides and columbium oxides, and from 0.1% to 4%, by weight of said mixture, of lanthanum oxide, said final mixture having been subjected to a pressure of at least 300 pounds per square inch during the firing operation.

14. A new and improved ceramic body having increased insulation resistance at high temperatures consisting essentially of a solid solution of lead titanate and lead zirconate in which the lead titanate is present in proportions within the range of 10 to 95 mol percent, consisting essentially of a compressed substantially homogeneous fired body of a mixture of $ZrO_2$, $TiO_2$, and lead oxide at least mainly in the form of $Pb_3O_4$, in requisite proportions to produce the aforesaid solid solutions of lead titanate and lead zirconate, said mixture also including from 0.5% to 7% of at least one material selected from the group consisting of cerium oxides and columbium oxides, and from 0.1% to 4% of lanthanum oxide, said percentages being based on the weight of the mixture, said final mixture having been subjected to a pressure of at least 75 pounds per square inch during the firing operation, said body having less than 2% of voids therein.

References Cited in the file of this patent

UNITED STATES PATENTS

| | | |
|---|---|---|
| 2,708,244 | Jaffe | May 10, 1955 |
| 2,721,182 | Clement | Oct. 18, 1955 |
| 2,739,900 | Day | Mar. 27, 1956 |